Figure 1:
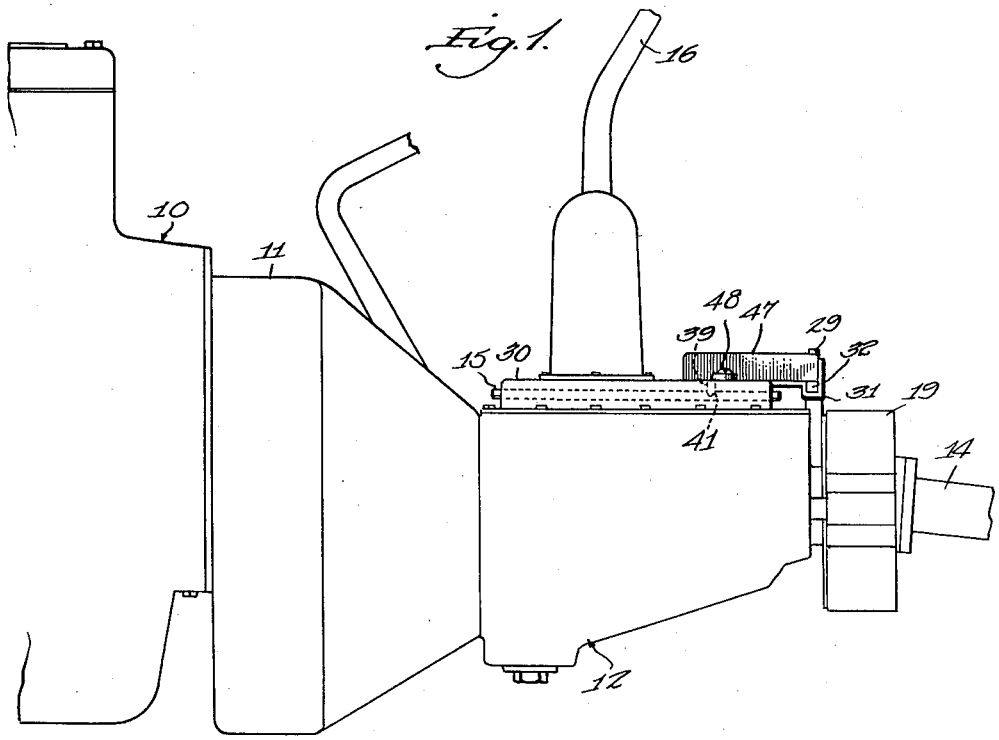

Nov. 10, 1931.  E. V. GRIFFIN ET AL  1,831,301
BRAKE RELEASING DEVICE
Original Filed June 14, 1929  2 Sheets-Sheet 1

Inventor
E. V. GRIFFIN
T. J. MARRINER
E. R. PARSONS

By C. L. Parker Jr.
Attorney

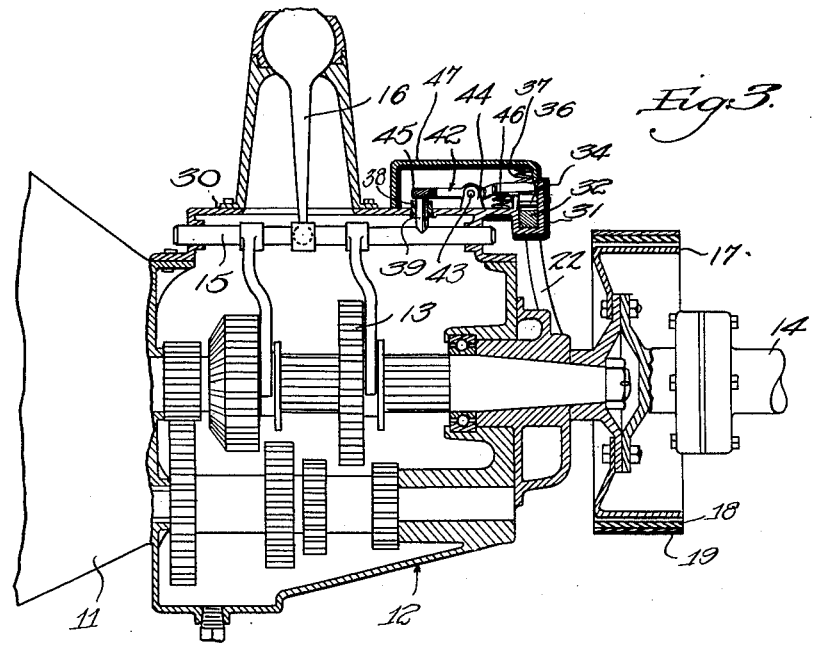
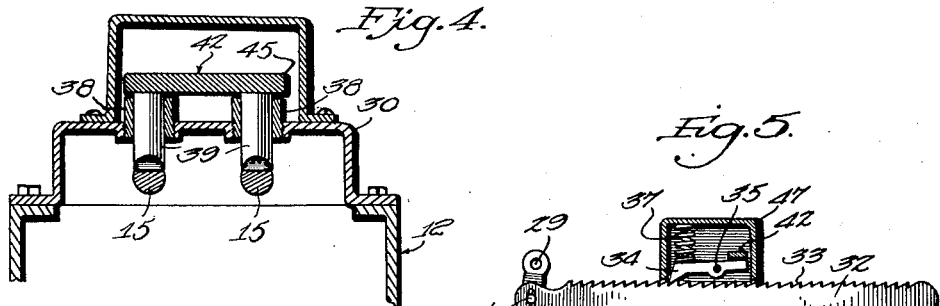
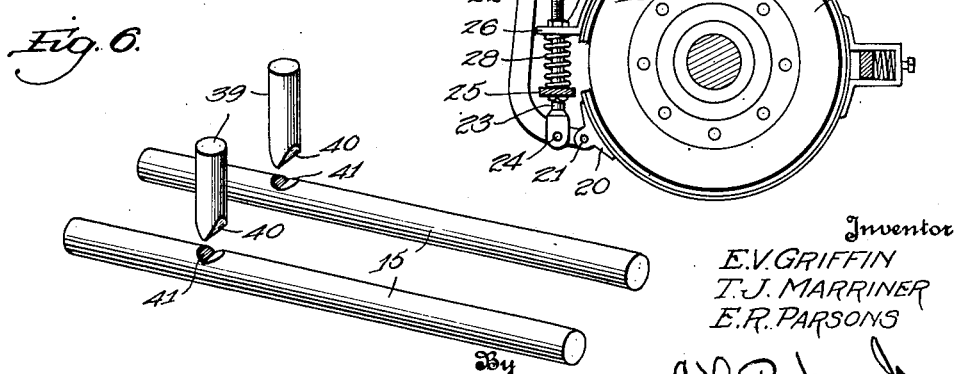
Inventor
E. V. GRIFFIN
T. J. MARRINER
E. R. PARSONS Patented Nov. 10, 1931

1,831,301

UNITED STATES PATENT OFFICE

ELLEGOOD V. GRIFFIN, THOMAS J. MARRINER, AND EDWARD R. PARSONS, OF NEW BERN, NORTH CAROLINA

BRAKE RELEASING DEVICE

Application filed June 14, 1929, Serial No. 370,910. Renewed March 23, 1931.

This invention relates to brake releasing devices, and more particularly to means for automatically releasing the emergency brake of a motor vehicle upon starting the vehicle to prevent running the latter with the emergency brake applied.

As is well known, it occasionally occurs that a driver of a motor vehicle will neglect to release the emergency brake of the vehicle when starting from a standstill, with the result that the vehicle will be run with the brake applied, thus burning and injuring the brake lining and placing an unnecessary load on the vehicle engine.

The tendency to start a vehicle with the emergency brake applied is increased under present traffic conditions wherein a large percentage of traffic intersections in metropolitan areas are controlled by vehicle signals. When a vehicle approaches an intersection which is closed to traffic by the signals at the intersection, it is necessary for the driver to either apply his service brake or emergency brake when the street on which he is traveling is on an incline. Many drivers make it a habit to apply the emergency brake under such circumstances, and it frequently happens that a driver will neglect to release the brake when again starting the vehicle.

An important object of the present invention is to provide simple and efficient means for automatically releasing the emergency brake of a vehicle upon the shifting of the gears to any position.

A further object is to provide novel means for utilizing the movement of either of the two shift rods of a motor vehicle transmission for automatically releasing the emergency brake when the gear shift lever is placed in any engaged position.

A further object is to provide novel ratchet means for holding an emergency brake in engaged position, and to provide means controlled by the movement of either of the two shift rods of the gear shift of the vehicle for releasing the ratchet mechanism to permit the emergency brake to become automatically disengaged.

Other objects and advantages of the invention will become apparent during the course of the following description.

Figure 2:
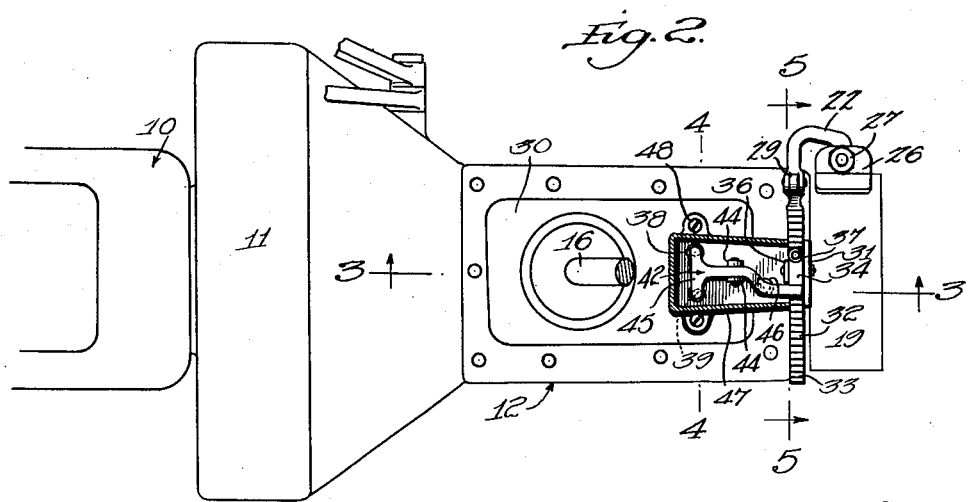

In the drawings we have shown one embodiment of the invention. In this showing,

Figure 1 is a side elevation of a vehicle gear shift mechanism and associated elements showing the invention applied, Figure 2 is a plan view of the same, parts being shown in section, Figure 3 is a section on line 3—3 of Figure 2, parts being shown in elevation, Figure 4 is a detail section on line 4—4 of Figure 2, Figure 5 is a similar view on line 5—5 of Figure 2, and, Figure 6 is a detail perspective view of the gear shift rods and associated releasing pins.

Referring to the drawings the numeral 10 designates a motor vehicle engine connected to the usual clutch 11 to transmit power to a gear set indicated as a whole by the numeral 12 and including suitable gearing 13 for transmitting power from the engine to a transmission shaft 14. The gear shift includes a pair of shift rods 15 which are adapted to be selectively shifted either forwardly or rearwardly according to the desired movement of the vehicle, and this shifting movement is accomplished by the usual gear shift lever 16.

The present invention is not limited in its application to any particular type of emergency brake, and the brake mechanism per se. shown in the drawings is merely illustrative. Referring to Figures 3 and 5, the numeral 17 designates a brake drum connected to the transmission shaft 14 and adapted to be engaged by a brake lining 18 carried by a contractible band 19. One end of the band 19 is provided with a lug 20 pivotally connected as at 21 to one end of an operating lever 22.

A rod 23 is pivotally connected at its lower end as at 24 to the lever 22 at a point spaced from the pivot 21, and the rod extends slidably through a stationary plate 25 which may be carried by the transmission casing. The upper end of the rod 23 extends through a lug 26 carried by the other end of the band 19, and a nut 27 is threaded on the upper end of the rod 23 to engage the lug 26. A coil spring 28 surrounds the rod 23 between the plate 25 and the lug 26. The upper end of the lever 22 is provided with an eye 29 which is adapted to be manually connected to the emergency brake lever by any suitable means (not shown), operation of which is adapted to move the upper end of the lever 22 outwardly away from the brake drum to apply the brake.

The transmission housing is preferably provided with a cover plate 30 in which the shift rods 15 are mounted, and this plate is provided at its rear end with a substantially U-shaped guide 31 in which is mounted a ratchet bar 32 carrying teeth 33. It will be apparent that the ratchet bar is slidable in the guide 31 transversely of the axis of rotation of the transmission shaft. One end of the bar 32 is connected to the lever 22 by a pin 32' which is operative in a suitable relatively short slot in the lever 22 to permit the bar 32 to partake of linear movement while the lever 22 swings about its pivot 21. The teeth 33 are adapted to be engaged by one end of a pawl 34 pivotally supported upon a pin 35 supported at one end in the outer wall of the guide 31 and at the other end by a lug 36 extending upwardly from the plate 30. A spring 37 is operative to normally retain the tooth of the pawl 34 in engagement with the teeth of the ratchet bar.

The cover plate 30 is provided with a pair of vertical sleeves 38 which may be threaded in the cover plate or formed integral therewith. Each of these guides slidably receives a pin 39 tapered at its lower end as at 40. These tapered ends are adapted to engage V-shaped slots 41 formed in the shift rods 15 when the gear shift lever is in neutral position.

A lever 42 is arranged between the pins 39 and the pawl 34 and is pivotally supported intermediate its ends as at 43 by a pair of upstanding lugs 44 preferably formed integral with the cover plate 30. One end of the lever is provided with a transverse head 45 the ends of which are arranged above and are adapted to contact with the upper ends of the pins 39. A spring 46 is arranged between the outer end of the lever 42 and the top of the cover plate 30 to normally urge the outer end of the lever upwardly and the inner end of the lever downwardly. As shown in Figure 2, the outer end of the lever 42 is offset to extend over the pawl 34 at the end thereof opposite the engaging tooth of the pawl. The lever 42 and associated elements are arranged within a suitable cover 47 secured to the cover plate 30 by screws or other fastening elements 48, and the upper end of the spring 37 contacts with the cover 47 as shown in Figure 5.

The operation of the device is as follows:
When the vehicle is to be left standing, the emergency brake lever, not shown, is moved to operative position, thus exerting an outward pull on the upper end of the lever 22 to apply the brake. This movement is transmitted to the ratchet bar 32, as will be apparent, and the teeth 33 escape beneath the tooth of the pawl 34. The pawl and ratchet mechanism obviously operates to hold the brake in applied position, and is substituted for the usual ratchet segment employed in connection with emergency brake constructions.

When it is desired to start the vehicle, it is not necessary for the operator to release the emergency brake. The engine is started, whereupon the gear shift lever is moved to the desired position. Such movement obviously effects movement of one of the shift rods 15, and under the circumstances, the groove 41 in the shift rod which is operated will be moved out of vertical alinement with its associated pin 39. The tapered lower end of the pin causes the latter to ride upwardly to become disengaged from the groove 41, and vertical movement of the pin 39 is transmitted to one end of the head 45 of the lever 42.

Upward movement of the inner end of the lever 42 obviously depresses the outer end of the lever, and accordingly the free end of the pawl 34 will be depressed to release the tooth of the pawl from the teeth of the ratchet bar 32. Under such conditions, the spring 28 operates to release the emergency brake, and the elements associated therewith will return to normal position.

The usual manually controlled ratchet mechanism of the emergency brake lever is omitted, and accordingly it is impossible for an operator to release the brake when the vehicle is started, the entire releasing operation being dependent upon the shifting of the gears. The operator can of course manually hold the emergency brake in operative position regardless of the position of the gear shift lever.

It will be apparent that movement of either of the shift rods 15 in either direction will effect vertical movement of one of the pins 39, and since both of these pins operate against the head 45 of the lever 42, it will be obvious that the brake will be released automatically upon the shifting of the gear shift lever to any of its positions.

As previously stated, a transmission type emergency brake is shown merely for the purpose of illustration, and it will be apparent that the device readily may be adapted for use in connection with any type of emergency brake so as to provide automatic means for releasing the brake to prevent the vehicle from being driven with the brake applied.

It will be apparent that the cover 47 may be sealed to the cover 30 of the gear shift casing, in which case the releasing mechanism will be rendered wholly inaccessible so that it will be operative only by shifting the gear shift lever 16. Accordingly the device acts as safety means to prevent theft of the vehicle.

It is the common practice in modern automobile manufacturing to provide coincidental locks which are operative to lock the ignition and to lock the gear shift lever in neutral position, but such locking devices do not prevent a vehicle from being moved manually or from being towed away. With the present device, the locking of the gear shift in neutral position will positively prevent the gear shift lever from being shifted, and thus the brake cannot be released except by removing the cover 30 of the gear shift mechanism. In the case of vehicles which are not provided with coincidental locking devices, the doors of the vehicle can be locked to prevent access to the gear shift lever, in which case, the present device also acts as safety means since the gear shift lever will not be accessible to unauthorized persons to permit it to be shifted to release the brake mechanism.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A device of the character described comprising a vehicle brake, a ratchet device operatively connected to the brake to maintain it in applied position, a vehicle gear shift lever, and means operative upon movement of the gear shift lever from neutral position for releasing said ratchet device.

2. A device of the character described comprising a vehicle brake, latch means automatically operative upon movement of the brake to operative position to maintain it in such position, a vehicle gear shift lever, and means connected to said latch means for releasing the latter upon movement of the lever from neutral position.

3. A device of the character described comprising a vehicle brake, a ratchet device automatically operative upon movement of the brake to operative position to maintain it in such position, vehicle gear shift mechanism including a gear shift lever and a plurality of shift rods, and release means connected between said ratchet device and one of said shift rods, and operative upon movement of the gear shift lever from neutral position.

4. A device of the character described comprising a vehicle brake, a ratchet device connected to said brake and including a pawl normally operative to retain the brake in applied position when moved to such position, a gear shift lever, and means operative upon movement of the gear shift lever from neutral position for releasing said pawl to permit the brake to move to inoperative position.

5. A device of the character described comprising a vehicle brake, a slidable ratchet bar connected to said brake, a pawl engaging said ratchet bar and operative in connection therewith for retaining the brake in applied position when moved to such position, a gear shift lever, and means operative upon movement of the gear shift lever for releasing said pawl from said ratchet bar.

6. A device of the character described comprising a vehicle brake, a slidable ratchet bar connected to said brake, a pawl engaging said ratchet bar and operative in connection therewith for retaining the brake in applied position when moved to such position, a lever having one end arranged adjacent said pawl, a gear shift lever, and means operative upon movement of the gear shift lever from neutral position for moving said first named lever to release said pawl from said ratchet bar.

7. A device of the character described comprising a vehicle brake, a slidable ratchet bar connected to said brake, a pawl engaging said ratchet bar and operative in connection therewith for retaining the brake in applied position when moved to such position, a lever having one end arranged adjacent said pawl and operative to release the latter from said ratchet bar, vehicle gear shift mechanism including a gear shift lever and a movable part, and means arranged between the opposite end of said lever and the movable part of the gear shift mechanism for operating said first named lever upon movement of the gear shift lever from neutral position.

8. A device of the character described comprising a vehicle brake, a slidable ratchet bar connected to said brake, a pawl engaging said ratchet bar and operative in connection therewith for retaining the brake in applied position when moved to such position, a lever having one end arranged adjacent said pawl and operative to release the latter from said ratchet bar, vehicle gear shift mechanism including a gear shift lever and a movable part, and a slidable pin contacting with the opposite end of said first named lever and operable by the movable part of the gear shift mechanism to actuate said first named lever upon movement of the gear shift lever from neutral position.

9. A device of the character described comprising a vehicle brake, latch mechanism connected to said brake to retain it in applied position when moved to such position, vehicle gear shift mechanism including a gear shift lever and a pair of shift rods having notches therein, a pair of slidable pins each having one end arranged in one of said notches when the gear shift mechanism is in neutral position, one of said shift rods being movable upon movement of the gear shift lever from neutral position to effect sliding movement of the associated pin, and means for transmitting sliding movement of either of said pins to said latch mechanism to release the latter and permit the brake to return to inoperative position upon movement of the gear shift lever from neutral position.

10. A device of the character described comprising a vehicle brake, latch mechanism connected to said brake to retain it in applied position when moved to such position, vehicle gear shift mechanism including a gear shift lever and a pair of shift rods having notches therein, a pair of slidable pins each having one end arranged in one of said notches when the gear shift mechanism is in neutral position, one of said shift rods being movable upon movement of the gear shift lever from neutral position to effect sliding movement of the associated pin, and a lever having one end connected to said latch mechanism and its opposite end associated with said pins to be actuated by either of the latter upon sliding movement thereof to release said latch mechanism upon movement of the gear shift lever from neutral position.

11. A device of the character described comprising a vehicle brake, a slidable ratchet bar connected to said brake, a pawl engaging said ratchet bar and operative in connection therewith for retaining the brake in applied position when moved to such position, a lever having one end arranged adjacent said pawl and operative to release the latter from said ratchet bar, a gear shift mechanism including a gear shift lever and a pair of shift rods, one of said shift rods being provided with a notch, and a slidable pin associated with the vehicle gear shift and having one end contacting at one end with said lever, the other end of said pin being arranged in said notch when the gear shift mechanism is in neutral position and being movable upon movement of the associated shift rod to actuate said first named lever when the gear shift lever is moved from neutral position.

12. A device of the character described comprising a vehicle brake, a slidable ratchet bar connected to said brake, a pawl engaging said ratchet bar and operative in connection therewith for retaining the brake in applied position when moved to such position, a lever having one end arranged adjacent said pawl and operative to release the latter from said ratchet bar, gear shift mechanism including a gear shift lever and a pair of shift rods each provided with a notch, and a pair of slidable pins contacting at one end with said lever and having their opposite ends arranged in the notches of said shift rods when the gear shift lever is in neutral position, one of said pins being slidable to actuate said lever upon actuation of the corresponding shift rod when the gear shift lever is moved from neutral position.

13. A device of the character described comprising a vehicle brake, latch means automatically operative upon movement of the brake to operative position to retain it in such position, a vehicle gear shift lever, means connected to said latch mechanism for releasing the latter upon movement of the gear shift lever from neutral position, and a fixed cover for said latch means and said releasing means to prevent operation of the latter except upon movement of the gear shift lever.

14. A device of the character described comprising a vehicle brake, latch means automatically operative upon movement of the brake to operative position to maintain it in such position, gear shift mechanism including a gear shift lever and a plurality of shift rods operable by the lever, release means connected between said latch means and one of said shift rods and operative upon movement of the gear shift lever from neutral position, and a fixed cover for said latch means and said release means to prevent operation of the latter except upon movement of the gear shift lever from neutral position.

15. The combination with a vehicle brake, and a gear shift mechanism including a gear shift lever, of latch means operatively connected to the brake to retain it in applied position when moved to such position, and means operative upon movement of the gear shift lever from neutral position for releasing said latch means.

16. The combination with a vehicle brake, and a gear shift mechanism including a gear shift lever and a plurality of shift rods, of latch means automatically operative upon movement of the brake to operative position to retain it in such position, and release means connected between said latch means and one of the shift rods and operative upon movement of the gear shift lever from neutral position.

17. The combination with a vehicle brake, and a gear shift mechanism including a gear shift lever, of a slidable ratchet bar connected to the brake, a pawl engaging said ratchet bar and operative in connection therewith for retaining the brake in applied position when moved to such position, and means operative upon movement of the gear shift lever for releasing said pawl from said ratchet bar.

18. The combination with a vehicle brake, and a gear shift mechanism including a gear shift lever, of a slidable ratchet bar connected to the brake, a pawl engaging said ratchet bar and operative in connection therewith for retaining the brake in applied position when moved to such position, a lever having one end arranged adjacent said pawl, and means operative upon movement of the gear shift lever from neutral position for moving said last named lever to release said pawl from said ratchet bar.

19. The combination with a vehicle brake, and a gear shift mechanism including a gear shift lever and a movable part controlled thereby, of a slidable ratchet bar connected to the brake, a pawl engaging said ratchet bar and operative in connection therewith for retaining the brake in operative position when moved to such position, a lever having one end arranged adjacent said pawl and operative to release the latter from said ratchet bar, and means arranged between the opposite end of said lever and said movable part of the gear shift mechanism for operating said last named lever upon movement of the gear shift lever from neutral position.

20. The combination with a vehicle brake, and a gear shift mechanism including a gear shift lever and a movable part controlled thereby, of a slidable ratchet bar connected to the brake, a pawl engaging said ratchet bar and operative in connection therewith for retaining the brake in applied position when moved to such position, a lever having one end arranged adjacent said pawl and operative to release the latter from said ratchet bar, and a slidable pin contacting with the opposite end of said last named lever and operable by said movable part of the gear shift mechanism to actuate said last named lever upon movement of the gear shift lever from neutral position.

21. The combination with a vehicle brake, and a gear shift mechanism including a gear shift lever and a pair of shift rods one of which is provided with a notch, of a slidable ratchet bar connected to the brake, a pawl engaging said ratchet bar and operative in connection therewith for retaining the brake in applied position when moved to such position, a lever having one end arranged adjacent said pawl and operative to release the latter from said ratchet bar, and a slidable pin contacting at one end with said last named lever, the other end of said pin being arranged in said notch when the gear shift lever is in neutral position, movement of the shift rod provided with the notch being operative to effect sliding movement of said pin when the gear shift lever is moved from neutral position to actuate said second named lever.

22. The combination with a vehicle brake, and a gear shift mechanism including a gear shift lever and a pair of shift rods controlled thereby, of a ratchet bar connected to the vehicle brake, a pawl engaging said ratchet bar and operative in connection therewith for retaining the brake in applied position when moved to such position, a lever having one end arranged adjacent said pawl and operative to release the latter from said ratchet bar, and a pair of slidable pins contacting at one end with said lever, said shift rods each being provided with a notch receiving the other end of one of said pins when the gear shift lever is in neutral position and operative to effect sliding movement of one of said pins when the gear shift lever is moved from neutral position to actuate said second named lever.

In testimony whereof we affix our signatures.

ELLEGOOD V. GRIFFIN.
THOMAS J. MARRINER.
EDWARD R. PARSONS.